United States Patent
Luff et al.

(10) Patent No.: US 12,306,344 B1
(45) Date of Patent: May 20, 2025

(54) REDUCTION OF COMPONENTS IN LIDAR SYSTEMS

(71) Applicant: SiLC Technologies, Inc., Monrovia, CA (US)

(72) Inventors: Bradley Jonathan Luff, La Canada Flintridge, CA (US); Mehdi Asghari, La Canada Flintridge, CA (US); Behnam Behroozpour, South San Francisco, CA (US)

(73) Assignee: SiLC Technologies, Inc., Monrovia, CA (US)

(*) Notice: Subject to any disclaimer, the term of this patent is extended or adjusted under 35 U.S.C. 154(b) by 450 days.

(21) Appl. No.: 17/002,756

(22) Filed: Aug. 25, 2020

(51) Int. Cl.
| | |
|---|---|
| *G01S 7/48* | (2006.01) |
| *G01S 7/4861* | (2020.01) |
| *G01S 17/00* | (2020.01) |
| *G01S 17/42* | (2006.01) |
| *G06F 17/14* | (2006.01) |

(52) U.S. Cl.
CPC .......... *G01S 7/4861* (2013.01); *G01S 17/006* (2013.01); *G01S 17/42* (2013.01); *G06F 17/14* (2013.01)

(58) Field of Classification Search
USPC ........................................ 356/4.01
See application file for complete search history.

(56) References Cited

U.S. PATENT DOCUMENTS

| | | | | |
|---|---|---|---|---|
| 5,041,832 A | * | 8/1991 | Gulczynski | H03M 1/162 341/158 |
| 6,977,502 B1 | * | 12/2005 | Hertz | G01R 33/3621 324/318 |
| 7,535,390 B2 | * | 5/2009 | Hsu | H03M 1/1061 341/120 |
| 8,541,744 B1 | * | 9/2013 | Liu | G01S 7/4802 250/338.5 |
| 8,558,993 B2 | * | 10/2013 | Newbury | G01S 7/484 356/4.1 |
| 9,310,487 B2 | * | 4/2016 | Sakimura | G01S 7/4818 |
| 9,857,468 B1 | * | 1/2018 | Eichenholz | G01S 17/88 |
| 9,893,737 B1 | * | 2/2018 | Keramat | H03K 5/08 |

(Continued)

FOREIGN PATENT DOCUMENTS

| | | | | |
|---|---|---|---|---|
| EP | 2955542 B1 | * | 4/2017 | ............... G01P 5/26 |
| WO | WO-2010123182 A1 | * | 10/2010 | ......... G06F 13/4282 |
| WO | WO-2012153309 A2 | * | 11/2012 | ............... G01C 3/08 |

OTHER PUBLICATIONS

Gulati, Kush, and Hae-Seung Lee. "A low-power reconfigurable analog-to-digital converter." IEEE Journal of Solid-State Circuits 36.12: 1900-1911. (Year: 2001).*

*Primary Examiner* — James R Hulka
(74) *Attorney, Agent, or Firm* — Gavrilovich, Dodd & Lindsey LLP

(57) ABSTRACT

A LIDAR system includes one or more optical components that output multiple system output signals. The system also includes electronics that use light from the system output signals to generate LIDAR data. The LIDAR data indicates a distance and/or radial velocity between the LIDAR system and one or more object located outside of the LIDAR system. The electronics including a series processing component that processes electrical signals that are each generated from one of the system output signals. The series processing component processes the electrical signals generated from different system output signals in series.

4 Claims, 7 Drawing Sheets

(56) References Cited

U.S. PATENT DOCUMENTS

| | | | |
|---|---|---|---|
| 10,605,901 B2* | 3/2020 | Lee | G01S 17/42 |
| 11,022,683 B1* | 6/2021 | Rezk | G01S 7/499 |
| 2003/0030582 A1* | 2/2003 | Vickers | G01S 17/86 |
| | | | 342/191 |
| 2005/0219068 A1* | 10/2005 | Jones | H04N 7/08 |
| | | | 348/E7.024 |
| 2008/0088184 A1* | 4/2008 | Tung | H02J 1/08 |
| | | | 307/80 |
| 2008/0174461 A1* | 7/2008 | Hsu | H03M 1/1061 |
| | | | 341/118 |
| 2008/0176681 A1* | 7/2008 | Donahoe | F41B 5/1403 |
| | | | 73/488 |
| 2010/0027379 A1* | 2/2010 | Saulnier | G08C 23/02 |
| | | | 367/137 |
| 2010/0159858 A1* | 6/2010 | Dent | H04B 1/30 |
| | | | 455/131 |
| 2011/0026643 A1* | 2/2011 | Ruelke | H04L 27/3863 |
| | | | 375/319 |
| 2011/0241895 A1* | 10/2011 | Griffin | B60N 2/002 |
| | | | 340/686.1 |
| 2012/0062230 A1* | 3/2012 | Vaughan, Jr. | G01R 33/3614 |
| | | | 324/318 |
| 2016/0324438 A1* | 11/2016 | Halpern | A61B 5/055 |
| 2016/0377721 A1* | 12/2016 | Lardin | G01S 17/58 |
| | | | 356/5.09 |
| 2017/0146641 A1* | 5/2017 | Walsh | G01S 7/4818 |
| 2017/0307648 A1* | 10/2017 | Kotake | G01S 7/484 |
| 2018/0088211 A1* | 3/2018 | Gill | G01S 7/4861 |
| 2018/0103431 A1* | 4/2018 | Suh | H04B 1/707 |
| 2018/0120433 A1* | 5/2018 | Eichenholz | G01S 7/4811 |
| 2018/0136321 A1* | 5/2018 | Verghese | G01S 7/487 |
| 2018/0269890 A1* | 9/2018 | Ojeda | H03D 3/007 |
| 2018/0306925 A1* | 10/2018 | Hosseini | G01S 17/42 |
| 2018/0372530 A1* | 12/2018 | Welle | G01F 23/284 |
| 2019/0004151 A1* | 1/2019 | Abediasl | G02F 1/292 |
| 2019/0011558 A1* | 1/2019 | Crouch | G01S 7/4866 |
| 2019/0025094 A1* | 1/2019 | Lewis | G01D 5/35361 |
| 2019/0086514 A1* | 3/2019 | Dussan | G01S 7/4817 |
| 2019/0086550 A1* | 3/2019 | Dussan | G01S 7/4861 |
| 2019/0187269 A1* | 6/2019 | Tong | G01S 7/003 |
| 2019/0204441 A1* | 7/2019 | Feneyrou | G01S 17/58 |
| 2019/0250396 A1* | 8/2019 | Blanche | G02B 26/101 |
| 2019/0257927 A1* | 8/2019 | Yao | G01S 17/931 |
| 2019/0310377 A1* | 10/2019 | Lodin | G02B 27/1086 |
| 2020/0072978 A1* | 3/2020 | Boloorian | G01S 7/4917 |
| 2020/0072979 A1* | 3/2020 | Boloorian | G01S 7/4915 |
| 2020/0088876 A1* | 3/2020 | Tanemura | G01S 7/006 |
| 2020/0116837 A1* | 4/2020 | Aghari | G01S 7/4913 |
| 2020/0116842 A1* | 4/2020 | Aghari | G01S 7/499 |
| 2020/0142065 A1* | 5/2020 | Boloorian | G01S 17/34 |
| 2020/0174095 A1* | 6/2020 | Altintas | H04L 27/2634 |
| 2020/0209366 A1* | 7/2020 | Maleki | G01S 17/58 |
| 2020/0300980 A1* | 9/2020 | Behzadi | G01S 7/4818 |
| 2020/0363515 A1* | 11/2020 | Luff | G01S 17/931 |
| 2020/0408911 A1* | 12/2020 | Boloorian | G01S 17/58 |
| 2020/0408912 A1* | 12/2020 | Boloorian | G01S 17/58 |
| 2021/0033732 A1* | 2/2021 | Boloorian | G01S 17/88 |
| 2021/0063541 A1* | 3/2021 | Zheng | G01S 7/4817 |
| 2021/0109195 A1* | 4/2021 | Feng | G01S 3/788 |
| 2021/0132232 A1* | 5/2021 | Asghari | H04J 14/0209 |
| 2023/0288566 A1* | 9/2023 | Nadkarni | G01S 17/87 |
| | | | 702/142 |

* cited by examiner

US 12,306,344 B1

REDUCTION OF COMPONENTS IN LIDAR SYSTEMS

FIELD

The invention relates to optical devices. In particular, the invention relates to LIDAR assemblies.

BACKGROUND

LIDAR systems can output multiple system output signals that each carries a different channel. The system output signals can each be reflected by one or more objects located outside of the LIDAR system. System return signals can carry the reflected light back to the LIDAR system. Each of the system return signals carries a different one of the channels.

The LIDAR system can include electronics that process light from the system return signals so as to generate LIDAR data that indicates the distance and/or radial velocity between the LIDAR system and the one or more objects. The electronics include many components that are duplicated. The duplication of these components increases the cost and/or complexity of the LIDAR system. As a result, there is a need for an improved LIDAR system.

SUMMARY

A LIDAR system has electronics that include a mathematical operation component that receives multiple different digital electrical signals as inputs. The mathematical operation component performs a mathematical operation on the multiple different digital electrical signals. Additionally, the mathematical operation component receives the different digital electrical signals from a common analog-to-digital converter. In some instances, the mathematical operation component is configured to perform a Fourier transform on the different digital electrical signals. In some instances, one of the different digital electrical signals is an in-phase component of a complex digital signal and another of the different digital electrical signals is the quadrature component of a complex digital signal.

DESCRIPTION

A LIDAR system is configured to output multiple system output signals that each carries a different channel. The system output signals can be reflected by objects located outside of the LIDAR system. The LIDAR system includes electronics that use light from the system output signals to generate LIDAR data results that indicate the distance and/or radial velocity between the LIDAR system and the one or more objects. The electronics include one or more mathematical operation components that operate on multiple different electrical signals. The electronics use the output of the one or more mathematical operation components to generate the LIDAR data.

The one or more mathematical operation components each receives the electrical signals upon which it operates from a common analog-to-digital converter. As a result, each of the one or more mathematical operation components may receive multiple different electrical signals as inputs while requiring a single analog-to-digital converter. Mathematical operation components that use multiple inputs and employ an analog-to-digital converter for each of the inputs have increased costs and complexity. Using an analog-to-digital converter that is common to each of the signals input to the mathematical operation component reduces the costs and complexity of the LIDAR system.

Figure 1A:
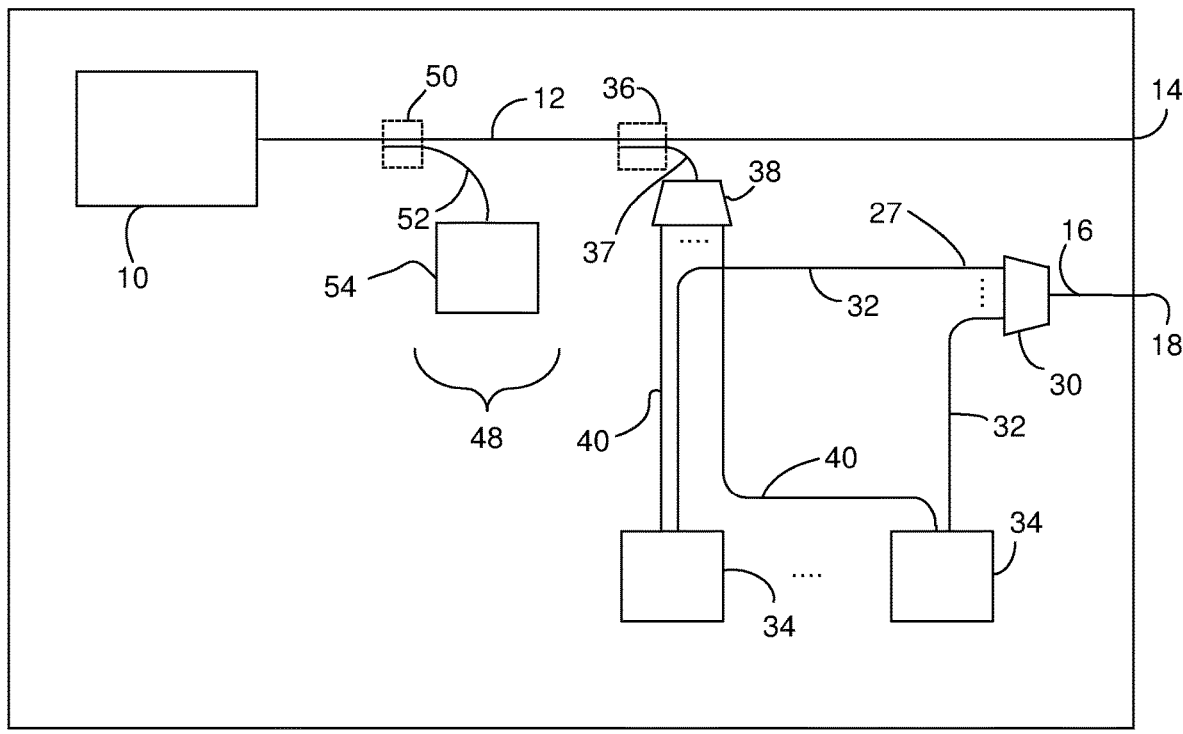
FIG. 1A is a top view of a LIDAR chip that is suitable for use with a LIDAR adapter.

FIG. 1A is a topview of a LIDAR chip that includes a photonic integrated circuit. The photonic circuit can include a light source 10 that outputs an outgoing LIDAR signal. The outgoing LIDAR signal includes one or more different channels that are each at a different wavelength. The wavelengths of the channels can be periodically spaced in that the wavelength increase from one channel to the next channel (the channel spacing) is constant or substantially constant. In some instances, the channels spacing is constant and greater than 0.5 nm, 1 nm, 3 nm, or 5 nm, and/or less than 10 nm, 15 nm, or 20 nm. In some instances, the number of channels, N, is greater than 2, 4 or 8 and/or less than 16, 32, or 64. A suitable light source 10 for generating multiple channels with periodically spaced wavelengths includes, but is not limited to, comb lasers and one or more single wavelength and/or one or more multiple wavelength lasers with outputs multiplexed into an outgoing LIDAR signal.

The LIDAR chip also includes a utility waveguide 12 that receives the outgoing LIDAR signal from the light source 10. The utility waveguide 12 terminates at a facet 14 and carries the outgoing LIDAR signal to the facet 14. The facet 14 can be positioned such that the outgoing LIDAR signal traveling through the facet 14 exits the chip and serves as a LIDAR output signal. For instance, the facet 14 can be positioned at an edge of the chip so the outgoing LIDAR signal traveling through the facet 14 exits the chip and serves as a LIDAR output signal.

The LIDAR output signal travels away from the chip and may be reflected by objects in the path of the LIDAR output signal. The reflected signal travels away from the objects. When the LIDAR output signal is reflected, at least a portion of the light from the reflected signal is returned to an input waveguide 16 on the LIDAR chip as a LIDAR input signal. The input waveguide 16 includes a facet 18 through which the LIDAR input signal can enter the input waveguide 16. The portion of the LIDAR input signal that enters the input waveguide 16 can be considered an incoming LIDAR signal. The input waveguide 16 carries the incoming LIDAR signal to comparative demultiplexer 30. When the incoming LIDAR signal includes multiple channels, the comparative demultiplexer 30 divides the incoming LIDAR signal into different comparative signals that each carries a different one of the channels. The comparative demultiplexer 30 outputs the comparative signals on different comparative waveguides 32. The comparative waveguides 32 each carry one of the comparative signals to a different processing component 34.

The LIDAR chip includes a splitter 36 that moves a portion of the outgoing LIDAR signal from the utility waveguide 12 onto a reference waveguide 37 as a reference signal. Suitable splitters 36 include, but are not limited to, optical couplers, y-junctions, and MMIs.

The reference waveguide 37 carries the reference light signal to a reference demultiplexer 38. When the reference light signal includes multiple channels, the reference demultiplexer 38 divides the reference light signal into different reference signals that each has a different wavelength. The reference demultiplexer 38 outputs the reference signals on different reference waveguides 40. The reference waveguides 40 each carry one of the reference signals to a different one of the processing components 34.

The comparative waveguides 32 and the reference waveguides 40 are configured such that a comparative signal and the corresponding reference signal are received at the same processing component 34. For instance, the comparative waveguides 32 and the reference waveguides 40 are configured such that the comparative signal and the reference signal of the same wavelength and/or carrying the same channel are received at the same processing component 34.

As will be described in more detail below, the processing components 34 each combines a comparative signal with the corresponding reference signal to form a composite signal that carries LIDAR data for a sample region on the field of view. Accordingly, the composite signal can be processed so as to extract LIDAR data (radial velocity and/or distance between a LIDAR system and an object external to the LIDAR system) for the sample region.

The LIDAR chip can include a control branch 48 for controlling operation of the light source 10. The control branch 48 includes a directional coupler 50 that moves a portion of the outgoing LIDAR signal from the utility waveguide 12 onto a control waveguide 52. The coupled portion of the outgoing LIDAR signal serves as a tapped signal. Although FIG. 1A illustrates a directional coupler 50 moving portion of the outgoing LIDAR signal onto the control waveguide 52, other signal-tapping components can be used to move a portion of the outgoing LIDAR signal from the utility waveguide 12 onto the control waveguide 52. Examples of suitable signal tapping components include, but are not limited to, y-junctions, and MMIs.

The control waveguide 52 carries the tapped signal to control components 54. The control components can be in electrical communication with electronics 62. During operation, the electronics 62 can adjust the frequency of the outgoing LIDAR signal in response to output from the control components. An example of a suitable construction of control components is provided in U.S. patent application Ser. No. 16/875,987, filed on 16 May 2020, entitled "Monitoring Signal Chirp in LIDAR Output Signals," and in U.S. patent application Ser. No. 15/977,957, filed on 11 May 2018, entitled "Optical Sensor Chip;" each of which incorporated herein in its entirety.

Suitable electronics 62 can include, but are not limited to, a controller that includes or consists of analog electrical circuits, digital electrical circuits, processors, microprocessors, digital signal processors (DSPs), computers, microcomputers, or combinations suitable for performing the operation, monitoring and control functions described above. In some instances, the controller has access to a memory that includes instructions to be executed by the controller during performance of the operation, control and monitoring functions. Although the electronics are illustrated as a single component in a single location, the electronics can include multiple different components that are independent of one another and/or placed in different locations. Additionally, as noted above, all or a portion of the disclosed electronics can be included on the chip including electronics that are integrated with the chip.

Figure 1B:
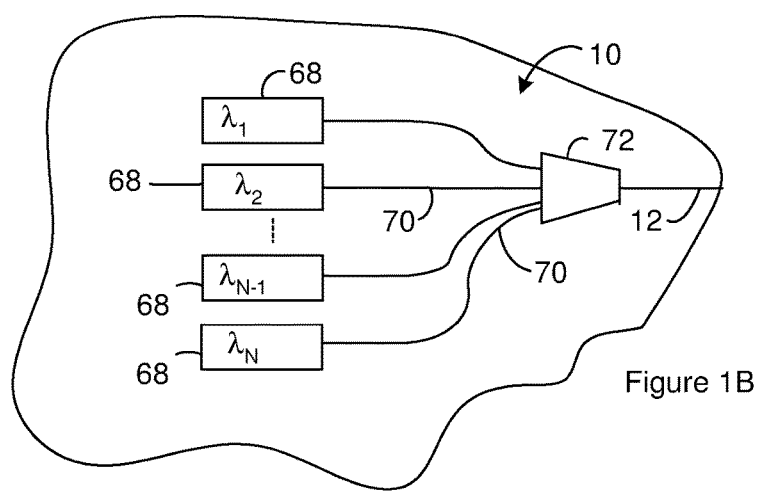
FIG. 1B illustrates a light source that includes multiple laser sources.

Although the light source 10 is shown as being positioned on the LIDAR chip, all or a portion of the light source 10 can be located off the LIDAR chip. FIG. 1B illustrates an example of a light source 10 that includes multiple laser sources 68. The light source of FIG. 1B can be located off the LIDAR chip, positioned on the LIDAR chip, or integrated on the LIDAR chip. In some instances, each of the laser sources 68 outputs one or more of the channels on a source waveguide 70. The source waveguides 70 carry the channels to a laser multiplexer 72 that combines the channels so as to form a light signal that is received on a channel waveguide or the utility waveguide 12. Suitable laser multiplexers 72 include, but are not limited to, Arrayed Waveguide Grating (AWG) multiplexers, echelle grating multiplexers, and star couplers. The electronics can operate the laser sources 68 so the laser sources 68 concurrently output each of the channels. The electronics can operate the laser sources 68 so the laser sources 68 concurrently output each of the channels.

In some instances, each of the laser sources 68 outputs one of the channels on a source waveguide 70. The total number of laser sources 68 included in the light source 10 can be greater than or equal to the number of LIDAR output signals that are concurrently directed to a sample region. In some instances, total number of laser sources 68 included in the light source 10 is equal to the number of LIDAR output signals that are concurrently directed to a sample region. As a result, each laser sources 68 can be the source of a different one of the LIDAR output signals that are concurrently directed to a sample region.

The electronics can operate the laser sources 68 independently. For instance, the electronics can operate the laser sources 68 so as to provide particular LIDAR output signal(s) with a particular frequency versus time waveform. Since the electronics can operate the laser sources 68 independently and each laser sources 68 can be the source of a different one of the LIDAR output signals, the electronics can operate the laser sources 68 so different LIDAR output signals have different frequency versus time waveforms.

Figure 2:
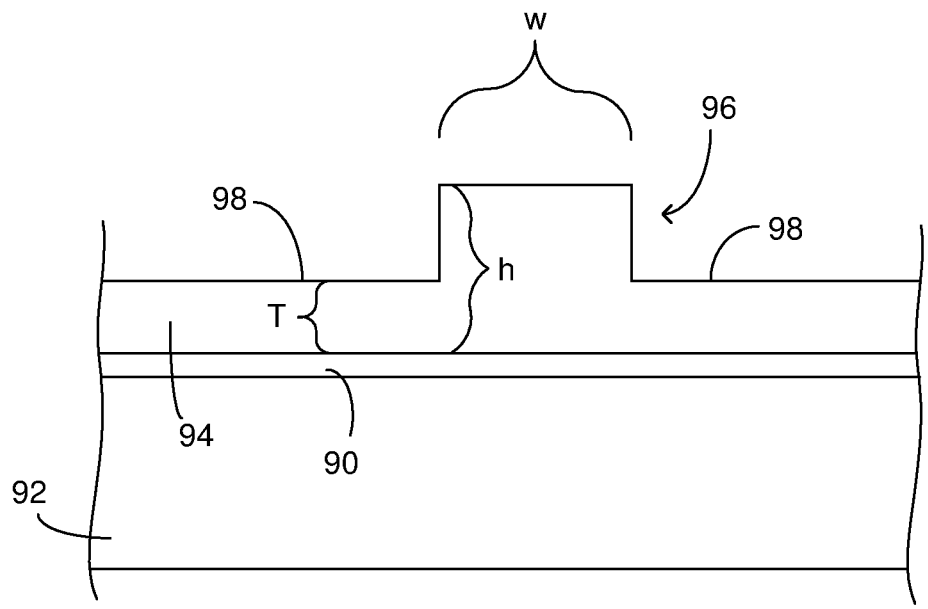
FIG. 2 is a cross-section of a LIDAR chip according to FIG. 1A constructed from a silicon-on-insulator wafer.

Suitable platforms for the LIDAR chips include, but are not limited to, silica, indium phosphide, and silicon-on-insulator wafers. FIG. 2 is a cross-section of portion of a chip constructed from a silicon-on-insulator wafer. A silicon-on-insulator (SOI) wafer includes a buried layer 90 between a substrate 92 and a light-transmitting medium 94. In a silicon-on-insulator wafer, the buried layer is silica while the substrate and the light-transmitting medium are silicon. The substrate of an optical platform such as an SOI wafer can serve as the base for the entire chip. For instance, the optical components shown in FIG. 1A can be positioned on or over the top and/or lateral sides of the substrate.

The portion of the chip illustrated in FIG. 2 includes a waveguide construction that is suitable for use with chips constructed from silicon-on-insulator wafers. A ridge 96 of the light-transmitting medium extends away from slab regions 98 of the light-transmitting medium. The light signals are constrained between the top of the ridge and the buried oxide layer.

The dimensions of the ridge waveguide are labeled in FIG. 2. For instance, the ridge has a width labeled w and a height labeled h. A thickness of the slab regions is labeled T. For LIDAR applications, these dimensions can be more important than other dimensions because of the need to use higher levels of optical power than are used in other applications. The ridge width (labeled w) is greater than 1 µm and less than 4 µm, the ridge height (labeled h) is greater than 1 µm and less than 4 µm, the slab region thickness is greater than 0.5 µm and less than 3 µm. These dimensions can apply to straight or substantially straight portions of the waveguide, curved portions of the waveguide and tapered portions of the waveguide(s). Accordingly, these portions of the waveguide will be single mode. However, in some instances, these dimensions apply to straight or substantially straight portions of a waveguide. Additionally or alternately, curved portions of a waveguide can have a reduced slab thickness in order to reduce optical loss in the curved portions of the waveguide. For instance, a curved portion of a waveguide can have a ridge that extends away from a slab region with a thickness greater than or equal to 0.0 µm and less than 0.5 µm. While the above dimensions will generally provide the straight or substantially straight portions of a waveguide with a single-mode construction, they can result in the tapered section(s) and/or curved section(s) that are multi-mode. Coupling between the multi-mode geometry to the single mode geometry can be done using tapers that do not substantially excite the higher order modes. Accordingly, the waveguides can be constructed such that the signals carried in the waveguides are carried in a single mode even when carried in waveguide sections having multi-mode dimensions. The waveguide construction of FIG. 2 is suitable for all or a portion of the waveguides on LIDAR chips constructed according to FIG. 1A.

The LIDAR chips can be used in conjunction with a LIDAR adapter. In some instances, the LIDAR adapter can be optically positioned between the LIDAR chip and the one or more reflecting objects and/or the field of view in that an optical path that the LIDAR input signal(s) and/or the LIDAR output signal travels from the LIDAR chip to the field of view passes through the LIDAR adapter. Additionally, the LIDAR adapter can be configured to operate on the LIDAR input signal and the LIDAR output signal such that the LIDAR input signal and the LIDAR output signal travel on different optical pathways between the LIDAR adapter and the LIDAR chip but on the same optical pathway between the LIDAR adapter and a reflecting object in the field of view.

Figure 3:
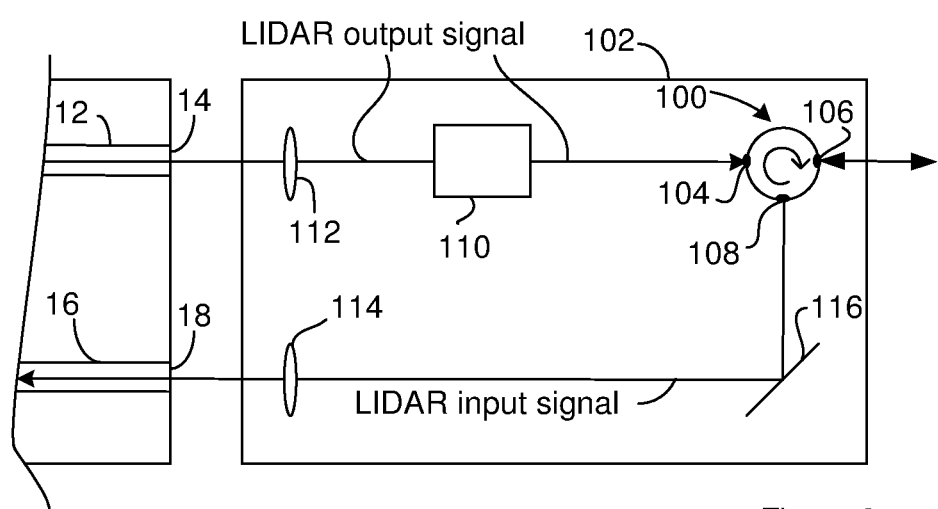
FIG. 3 is a top view of a LIDAR adapter in optical communication with an LIDAR chip.

FIG. 3 illustrates an example of a LIDAR adapter that is suitable for use with the LIDAR chip of FIG. 1A. The LIDAR adapter includes multiple components positioned on a base. For instance, the LIDAR adapter includes a circulator 100 positioned on a base 102. The illustrated optical circulator 100 includes three ports and is configured such that light entering one port exits from the next port. For instance, the illustrated optical circulator includes a first port 104, a second port 106, and a third port 108. The LIDAR output signal enters the first port 104 from the utility waveguide 12 of the LIDAR chip and exits from the second port 106. The LIDAR adapter can be configured such that the output of the LIDAR output signal from the second port 106 can also serve as the output of the LIDAR output signal from the LIDAR adapter. The portion of the LIDAR output signal output from the LIDAR adapter and/or the portion of the LIDAR output signal output from the second port 106 can serve as a preliminary system output signal. As a result, the preliminary system output signal can be output from the LIDAR adapter such that the preliminary system output signal is traveling toward a sample region in the field of view or toward one or more other optical components such as a directional component.

The preliminary system output signal includes, consists of, or consists essentially of light from the LIDAR output signal received from the LIDAR chip. Accordingly, the preliminary system output signal may be the same or substantially the same as the LIDAR output signal received from the LIDAR chip. However, there may be differences between the preliminary system output signal and the LIDAR output signal received from the LIDAR chip. For instance, the preliminary system output signal can experience optical loss as it travels through the LIDAR adapter.

When light from the preliminary system output signal is reflected by one or more objects located in a sample region(s), at least a portion of the reflected light returns to the adapter as a returned signal. For instance, at least a portion of the reflected light can return to circulator 100 and enter the circulator 100 through the second port 106. FIG. 3 illustrates the preliminary system output signal and the returned signal traveling between the LIDAR adapter and the sample region along the same optical path.

The returned signal exits the circulator 100 through the third port 108 and is directed to the input waveguide 16 on the LIDAR chip. Accordingly, light from the returned signal can serve as the LIDAR input signal and the LIDAR input signal includes or consists of light from the LIDAR return signal. Accordingly, the LIDAR output signal and the LIDAR input signal travel between the LIDAR adapter and the LIDAR chip along different optical paths.

As is evident from FIG. 3, the LIDAR adapter can include optical components in addition to the circulator 100. For instance, the LIDAR adapter can include components for directing and controlling the optical path of the LIDAR output signal and the LIDAR return signal. As an example, the adapter of FIG. 3 includes an optional amplifier 110 positioned so as to receive and amplify the LIDAR output signal before the LIDAR output signal enters the circulator 100. The amplifier 110 can be operated by the electronics 62 allowing the electronics 62 to control the power of the LIDAR output signal.

FIG. 3 also illustrates the LIDAR adapter including an optional first lens 112 and an optional second lens 114. The first lens 112 can be configured to couple the LIDAR output signal to a desired location. In some instances, the first lens 112 is configured to focus or collimate the LIDAR output signal at a desired location. In one example, the first lens 112 is configured to couple the LIDAR output signal on the first port 104 when the LIDAR adapter does not include an amplifier 110. As another example, when the LIDAR adapter includes an amplifier 110, the first lens 112 can be configured to couple the LIDAR output signal on the entry port to the amplifier 110. The second lens 114 can be configured to couple the LIDAR output signal at a desired location. In some instances, the second lens 114 is configured to focus or collimate the LIDAR output signal at a desired location. For instance, the second lens 114 can be configured to couple the LIDAR output signal on the facet 18 of the input waveguide 16.

The LIDAR adapter can also include one or more direction changing components such as mirrors. FIG. 3 illustrates the LIDAR adapter including a mirror as a direction-changing component 116 that redirects the LIDAR return signal from the circulator 100 to the facet 18 of the input waveguide 16.

The LIDAR chips include one or more waveguides that constrains the optical path of one or more light signals. While the LIDAR adapter can include waveguides, the optical path that the light from the returned signal and the LIDAR output signal travel between components on a LIDAR adapter and/or between the LIDAR chip and a component on the LIDAR adapter can be free space. For instance, light from the returned signal and/or the LIDAR output signal can travel through the atmosphere in which the LIDAR chip, the LIDAR adapter, and/or the base 102 is positioned when traveling between the different components on the LIDAR adapter and/or between a component on the LIDAR adapter and the LIDAR chip. As a result, optical components such as lenses and direction changing components can be employed to control the characteristics of the optical path traveled by light from the returned signal and the preliminary system output signal on, to, and from the LIDAR adapter.

Suitable bases 102 for the LIDAR adapter include, but are not limited to, substrates, platforms, and plates. Suitable substrates include, but are not limited to, glass, silicon, and ceramics. The components can be discrete components that are attached to the substrate. Suitable techniques for attaching discrete components to the base 102 include, but are not limited to, epoxy, solder, and mechanical clamping. In one example, one or more of the components are integrated components and the remaining components are discrete components. In another example, the LIDAR adapter includes one or more integrated amplifiers and the remaining components are discrete components.

Figure 4:
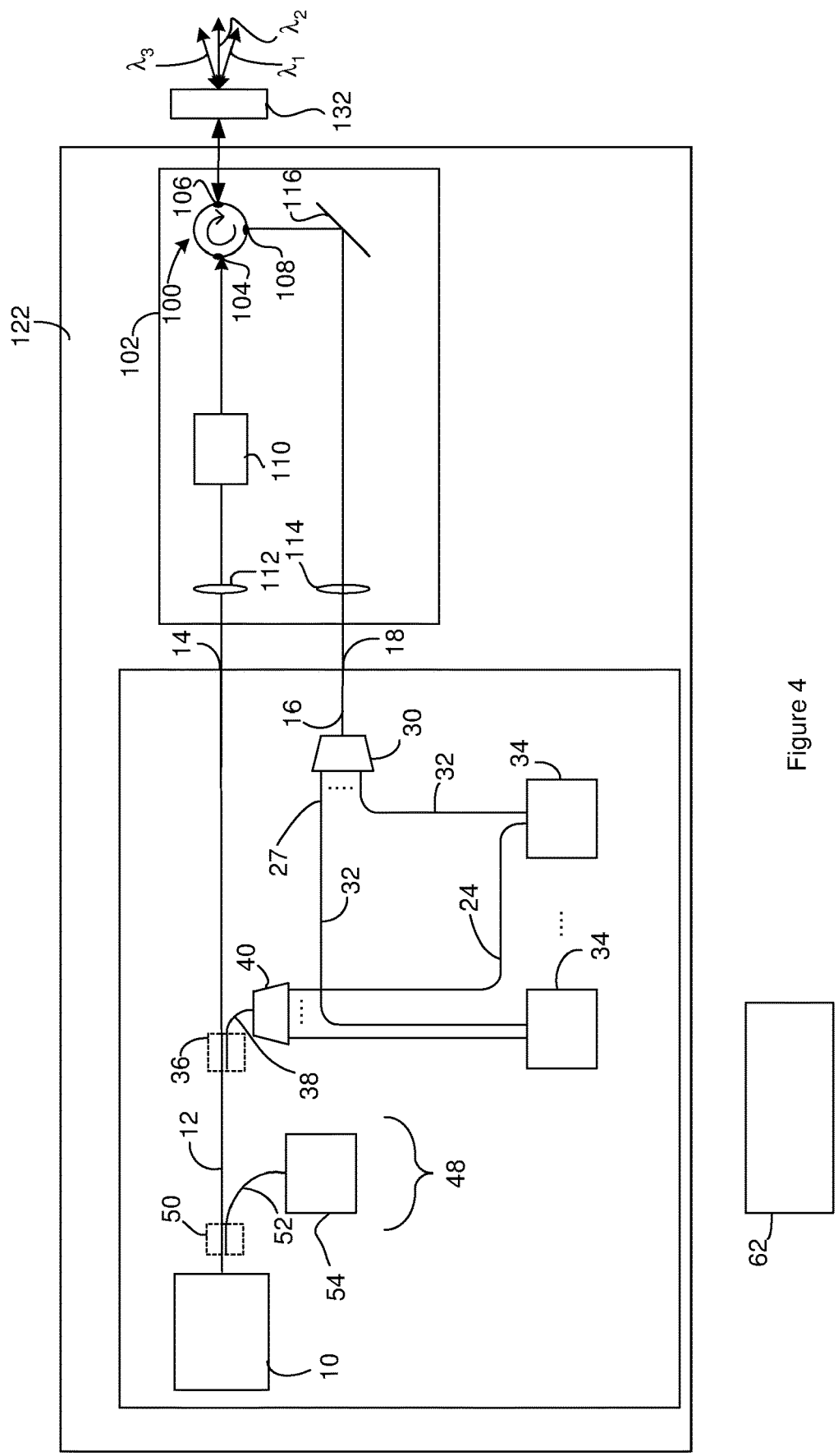
FIG. 4 is a topview of a LIDAR system that includes the LIDAR chip and electronics of FIG. 1A and the LIDAR adapter of FIG. 3 on a common support.

The LIDAR chip, electronics, and the LIDAR adapter can be positioned on a common mount. Suitable common mounts include, but are not limited to, glass plates, metal plates, silicon plates and ceramic plates. As an example, FIG. 4 is a topview of a LIDAR assembly that includes the LIDAR chip and electronics 62 of FIG. 1A and the LIDAR adapter of FIG. 3 on a common support 122. Although the electronics 62 are illustrated as being located on the common support, all or a portion of the electronics can be located off the common support. Suitable approaches for mounting the LIDAR chip, electronics, and/or the LIDAR adapter on the common support include, but are not limited to, epoxy, solder, and mechanical clamping.

Although the LIDAR assembly is shown as operating with a LIDAR chip that outputs a single LIDAR output signal, the LIDAR chip can be configured to output multiple LIDAR output signals. Multiple LIDAR adapters can be used with a single LIDAR chip and/or a LIDAR adapter can be scaled to receive multiple LIDAR output signals.

A LIDAR system can include the LIDAR assembly 130 employed in conjunction with one or more additional optical components. For instance, LIDAR a system can include the LIDAR assembly 130 employed in conjunction with a directional component 132 as shown in FIG. 4.

In FIG. 4, the directional component 132 receives the preliminary system output signal output from the adapter. The directional component 132 separates the channels carried by the preliminary system output signal into system output signals that each carries a different one of the channels. The directional component 132 can also be configured to steer each system output signal to multiple different sample regions in a field of view. Light from a system output signal can be reflected by one or more objects positioned in a sample region illuminated by the system output signal. The light returns to the LIDAR system in a system return signal. Different system return signals each carry a different one of the channels. The directional component can be configured to combine the system return signals into the returned signal that is output from the directional component and received by the LIDAR assembly and/or by the adapter.

Figure 5:
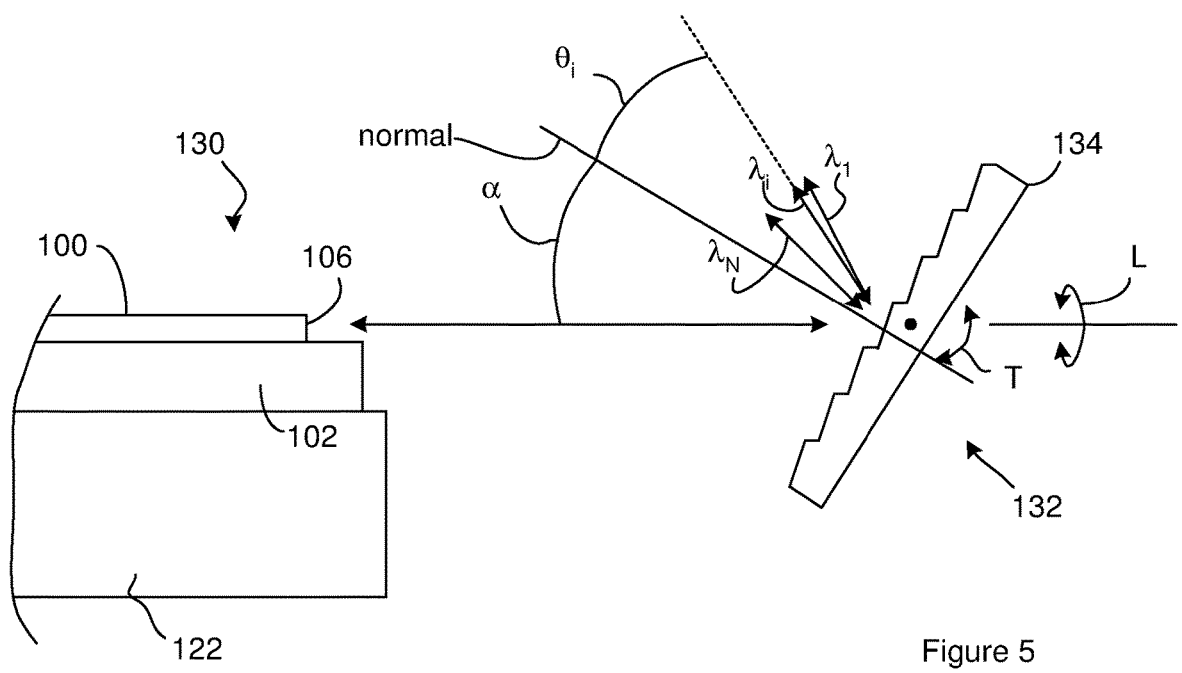
FIG. 5 is a cross section of a LIDAR system that includes a LIDAR assembly in optical communication with a directional component that includes a reflective optical grating.

FIG. 5 is an example of a cross section of a LIDAR system that includes a LIDAR assembly 130 in optical communication with a directional component 132. The cross section is taken through the LIDAR output signal and perpendicular to the common support 122. The LIDAR assembly 130 can be constructed as disclosed above. For instance, the LIDAR assembly 130 can be constructed according to FIG. 4.

The directional component 132 includes an optical grating 134 configured to receive the LIDAR output signal from the LIDAR assembly 130. The optical grating 134 is a reflective optical grating 134 that reflects the LIDAR output signal such that the LIDAR output signal is demultiplexed into system output signals. Each of the system output signals carries one of the channels that are labeled $\lambda_i$ through $\lambda_N$ where N represents the number of channels output from the optical grating 134. The system output signals each travels away from the optical grating 134 in a different direction. When all or a portion of the system output signals are reflected by an object in the path of the system output signal, a portion of the reflected light returns to the optical grating 134 as a LIDAR input channel. The optical grating 134 is configured to multiplex the LIDAR input channels into the LIDAR return signal that is received by the LIDAR assembly 130. Suitable reflective optical gratings 134 include, but are not limited to, ruled diffraction gratings, holographic diffraction gratings, and digital planar holographic diffraction gratings.

Figure 6:
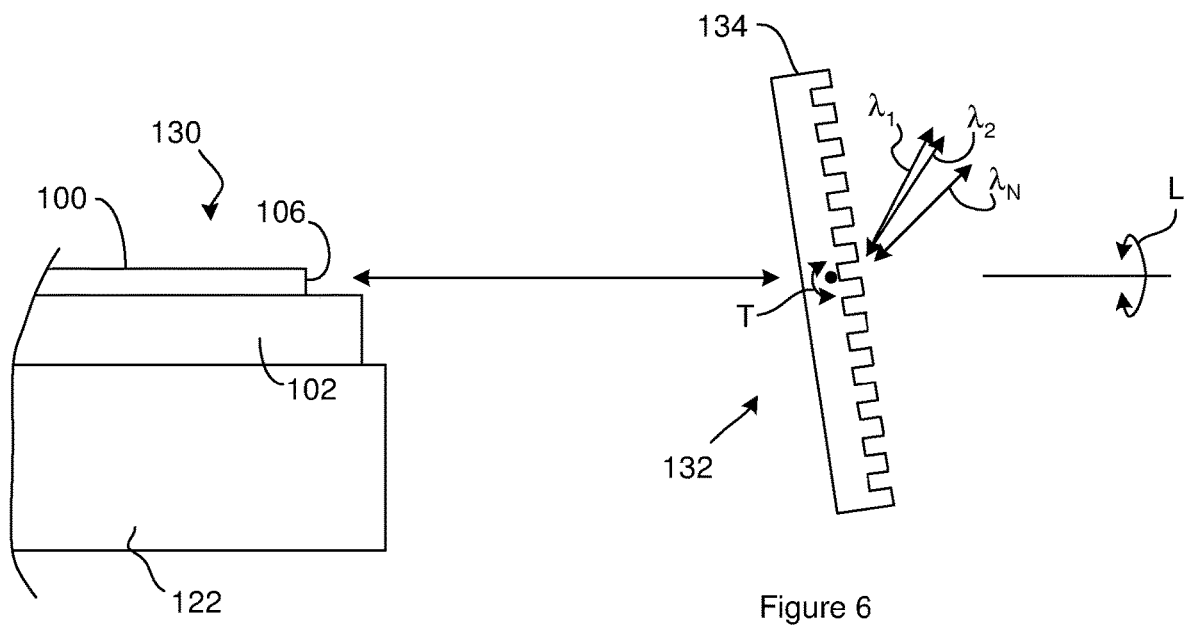
FIG. 6 is a cross section of a LIDAR system that includes a LIDAR assembly in optical communication with a directional component that includes a transmissive optical grating.

The optical grating 134 can be a transmissive optical grating 134. For instance, FIG. 6 is a cross section of a LIDAR system having a LIDAR assembly 130 and a directional component 132 that includes a transmissive optical grating 134. The cross section is taken through the LIDAR output signal and perpendicular to the common support 122. The LIDAR assembly 130 can be constructed as disclosed above. For instance, the LIDAR assembly 130 can be constructed according to FIG. 4.

The transmissive optical grating 134 receives the LIDAR output signal from the LIDAR assembly 130. The LIDAR output signal is transmitted through the optical grating 134 and output from the optical grating 134 such that the LIDAR output signal is demultiplexed into system output signals labeled $\lambda_i$ through $\lambda_N$. The system output signals each travels away from the optical grating 134 in a different direction (i). When all or a portion of the system output signals are reflected by an object in the path of the system output signal, a portion of the reflected light returns to the optical grating 134 as a LIDAR input channel. The optical grating 134 is configured to multiplex the LIDAR input channels into the LIDAR return signal that is received by the LIDAR assembly 130. Suitable transmissive optical gratings 134 include, but are not limited to, ruled diffraction gratings, holographic diffraction gratings, and digital planar holographic diffraction gratings.

The optical gratings 134 can be rotated in one or more directions in order to steer the direction that the system output signals travel away from the optical grating 134. The one or more rotations of the optical grating 134 can be performed by motors and/or actuation mechanism including, but not limited to, motors such as electromagnetic motors and piezoelectric motors.

In some instances, the optical grating 134 can be rotated such that the angle of incidence ($\alpha$) of the LIDAR input signal on the optical grating 134 does not change or does not change substantially. For instance, the optical grating 134 can be rotated around an axis that is parallel to the direction of the LIDAR output signal and includes the location where the direction of the LIDAR output signal is incident on the optical grating 134 (the incident axis) as illustrated by the arrow labeled L in FIG. 5 and FIG. 6. Since the angle of incidence ($\alpha$) does not substantially change during these rotations, the angular direction each system output signal travels away from the optical grating 134 ($\theta_i$) remains constant or substantially constant.

Additionally or alternately, the optical gating can be rotated so as to change the angle of incidence ($\alpha$) of the LIDAR input signal on the optical grating 134. For instance, the optical grating 134 can be rotated around a transverse axis that is perpendicular to the incident axis and parallel to a plane of the optical grating 134 and/or extends through the optical grating 134 as illustrated by the arrow labeled T in FIG. 5 and FIG. 6. In some instances, the transverse axis is selected such that the location where the direction of the LIDAR output signal is incident on the optical grating 134 does not change or does not change substantially during the rotation in order to reduce possible movement of a portion of the LIDAR output signal off the optical grating. Since the angle of incidence ($\alpha$) changes during this rotation, the angular direction that each system output signal travels away from the optical grating 134 ($\theta_i$) changes in response to the rotation.

The directional component 132 can optionally include one or more active and/or one or more passive optical components between the optical grating 134 and the LIDAR assembly 130. Examples of suitable passive optical components include, but are not limited to, optical fibers, lenses, mirrors, polarizers, polarization splitters, and wave plates. Active components include components where electrical energy is applied to and/or received from the component in order for the optical component to provide its intended function. Examples of suitable active optical components include, but are not limited to, amplifiers 140, actuated mirrors, and actuated lenses.

Other examples of suitable directional components 132 can be found in U.S. patent application Ser. No. 16/675,203, filed on Nov. 5, 2019, entitled "LIDAR Output Steering Systems Having Optical Gratings," and incorporated herein in its entirety.

Although FIG. 4 through FIG. 6 illustrate the directional component 132 positioned outside of the LIDAR assembly, the directional component can be included in the LIDAR assembly. For instance, the directional component 132 can be positioned on the base 102 or on the common support 122. When the directional component 132 is positioned on the base 102, the directional component 132 receives the LIDAR output signal from the circulator. For instance, the directional component 132 can receive the LIDAR output signal from the second port 106 of the circulator 100. Accordingly, the portion of the LIDAR output signal that exits from the circulator serves as the preliminary system output signal. The directional component 132 separates the channels carried by the preliminary system output signal into system output signals that each carries a different one of the channels.

Figure 7A:
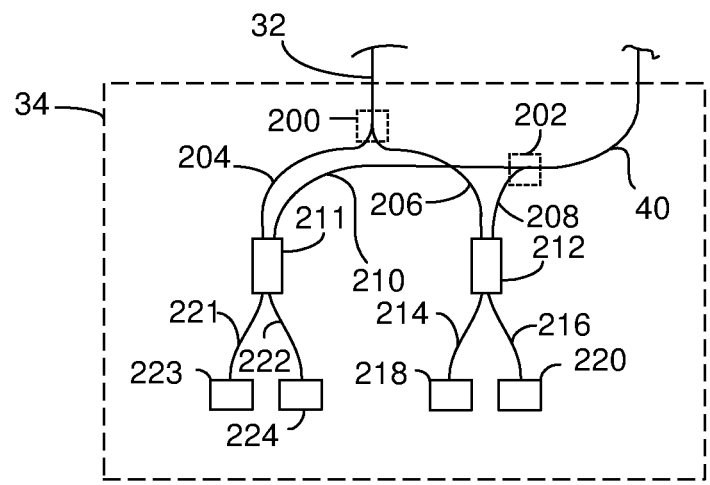
FIG. 7A illustrates an example of a processing unit suitable for use with the LIDAR system of FIG. 1A.
Figure 7B:
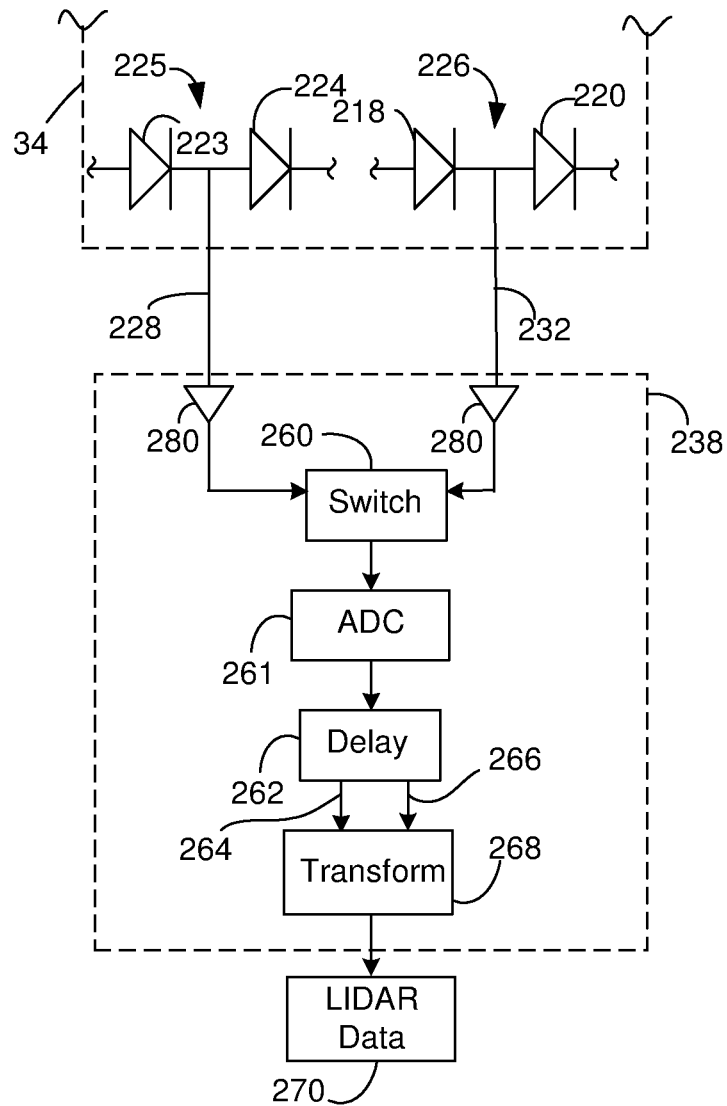
FIG. 7B provides a schematic of electronics that are suitable for use with a processing unit constructed according to FIG. 7A.

FIG. 7A through FIG. 7B illustrate an example of a suitable processing component 34 for use as each one of the processing components 34 in the above LIDAR assemblies. As described in the context of FIG. 1A, each processing component 34 receives a comparative signal from a comparative waveguide 32 and a reference signal from a reference waveguide 40. The processing unit includes a second splitter 200 that divides the comparative signal carried on the comparative waveguide 32 onto a first comparative waveguide 204 and a second comparative waveguide 206. The first comparative waveguide 204 carries a first portion of the comparative signal to a light-combining component 211. The second comparative waveguide 206 carries a second portion of the comparative signal to a second light-combining component 212.

The processing component includes a first splitter 202 that divides the reference signal carried on the reference waveguide 40 onto a first reference waveguide 210 and a second reference waveguide 208. The first reference waveguide 210 carries a first portion of the reference signal to the light-combining component 211. The second reference waveguide 208 carries a second portion of the reference signal to the second light-combining component 212.

The second light-combining component 212 combines the second portion of the comparative signal and the second portion of the reference signal into a second composite signal. Due to the difference in frequencies between the second portion of the comparative signal and the second portion of the reference signal, the second composite signal is beating between the second portion of the comparative signal and the second portion of the reference signal.

The second light-combining component 212 also splits the resulting second composite signal onto a first auxiliary detector waveguide 214 and a second auxiliary detector waveguide 216. The first auxiliary detector waveguide 214 carries a first portion of the second composite signal to a first auxiliary light sensor 218 that converts the first portion of the second composite signal to a first auxiliary electrical signal. The second auxiliary detector waveguide 216 carries a second portion of the second composite signal to a second auxiliary light sensor 220 that converts the second portion of the second composite signal to a second auxiliary electrical signal. Examples of suitable light sensors include germanium photodiodes (PDs), and avalanche photodiodes (APDs).

In some instances, the second light-combining component 212 splits the second composite signal such that the portion of the comparative signal (i.e. the portion of the second portion of the comparative signal) included in the first portion of the second composite signal is phase shifted by 180° relative to the portion of the comparative signal (i.e. the portion of the second portion of the comparative signal) in the second portion of the second composite signal but the portion of the reference signal (i.e. the portion of the second portion of the reference signal) in the second portion of the second composite signal is not phase shifted relative to the portion of the reference signal (i.e. the portion of the second portion of the reference signal) in the first portion of the second composite signal. Alternately, the second light-combining component 212 splits the second composite signal such that the portion of the reference signal (i.e. the portion of the second portion of the reference signal) in the first portion of the second composite signal is phase shifted by 180° relative to the portion of the reference signal (i.e. the portion of the second portion of the reference signal) in the second portion of the second composite signal but the portion of the comparative signal (i.e. the portion of the second portion of the comparative signal) in the first portion of the second composite signal is not phase shifted relative to the portion of the comparative signal (i.e. the portion of the second portion of the comparative signal) in the second portion of the second composite signal. Examples of suitable light sensors include germanium photodiodes (PDs), and avalanche photodiodes (APDs).

The first light-combining component 211 combines the first portion of the comparative signal and the first portion of the reference signal into a first composite signal. Due to the difference in frequencies between the first portion of the comparative signal and the first portion of the reference signal, the first composite signal is beating between the first portion of the comparative signal and the first portion of the reference signal.

The light-combining component 211 also splits the first composite signal onto a first detector waveguide 221 and a second detector waveguide 222. The first detector waveguide 221 carries a first portion of the first composite signal to a first light sensor 223 that converts the first portion of the second composite signal to a first electrical signal. The second detector waveguide 222 carries a second portion of the second composite signal to a second auxiliary light sensor 224 that converts the second portion of the second composite signal to a second electrical signal. Examples of suitable light sensors include germanium photodiodes (PDs), and avalanche photodiodes (APDs).

In some instances, the light-combining component 211 splits the first composite signal such that the portion of the comparative signal (i.e. the portion of the first portion of the comparative signal) included in the first portion of the composite signal is phase shifted by 180° relative to the portion of the comparative signal (i.e. the portion of the first portion of the comparative signal) in the second portion of the composite signal but the portion of the reference signal (i.e. the portion of the first portion of the reference signal) in the first portion of the composite signal is not phase shifted relative to the portion of the reference signal (i.e. the portion of the first portion of the reference signal) in the second portion of the composite signal. Alternately, the light-combining component 211 splits the composite signal such that the portion of the reference signal (i.e. the portion of the first portion of the reference signal) in the first portion of the composite signal is phase shifted by 180° relative to the portion of the reference signal (i.e. the portion of the first portion of the reference signal) in the second portion of the composite signal but the portion of the comparative signal (i.e. the portion of the first portion of the comparative signal) in the first portion of the composite signal is not phase shifted relative to the portion of the comparative signal (i.e. the portion of the first portion of the comparative signal) in the second portion of the composite signal.

When the second light-combining component 212 splits the second composite signal such that the portion of the comparative signal in the first portion of the second composite signal is phase shifted by 180° relative to the portion of the comparative signal in the second portion of the second composite signal, the light-combining component 211 also splits the composite signal such that the portion of the comparative signal in the first portion of the composite signal is phase shifted by 180° relative to the portion of the comparative signal in the second portion of the composite signal. When the second light-combining component 212 splits the second composite signal such that the portion of the reference signal in the first portion of the second composite signal is phase shifted by 180° relative to the portion of the reference signal in the second portion of the second composite signal, the light-combining component 211 also splits the composite signal such that the portion of the reference signal in the first portion of the composite signal is phase shifted by 180° relative to the portion of the reference signal in the second portion of the composite signal.

The first reference waveguide 210 and the second reference waveguide 208 are constructed to provide a phase shift between the first portion of the reference signal and the second portion of the reference signal. For instance, the first reference waveguide 210 and the second reference waveguide 208 can be constructed so as to provide a 90° phase shift between the first portion of the reference signal and the second portion of the reference signal. As an example, one reference signal portion can be an in-phase component and the other a quadrature component. Accordingly, one of the reference signal portions can be a sinusoidal function and the other reference signal portion can be a cosine function. In one example, the first reference waveguide 210 and the second reference waveguide 208 are constructed such that the first reference signal portion is a cosine function and the second reference signal portion is a sine function. Accordingly, the portion of the reference signal in the second composite signal is phase shifted relative to the portion of the reference signal in the first composite signal, however, the portion of the comparative signal in the first composite signal is not phase shifted relative to the portion of the comparative signal in the second composite signal.

FIG. 7B provides a schematic of the relationship between the electronics and the light sensors in a processing component. The symbol for a photodiode is used to represent the first light sensor 223, the second light sensor 224, the first auxiliary light sensor 218, and the second auxiliary light sensor 220 but one or more of these sensors can have other constructions. In some instances, all of the components illustrated in the schematic of FIG. 7B are included on the LIDAR chip. In some instances, the components illustrated in the schematic of FIG. 7B are distributed between the LIDAR chip and electronics located off of the LIDAR chip.

The processing unit receives comparative signals and reference signals that carry the same channel. Additionally, different processing units receive comparative signals and reference signals that carry different channels. For instance, the processing unit 34 can receive the comparative signals and reference signals that carry the first channel (21). As a result, LIDAR data generated from the processing unit 34 is for a sample region that is illuminated by a system output signal carrying the first channel.

The electronics connect the first light sensor 223 and the second light sensor 224 as a first balanced detector 225 and the first auxiliary light sensor 218 and the second auxiliary light sensor 220 from the same processing component as a second balanced detector 226. In particular, the first light sensor 223 and the second light sensor 224 are connected in series and the first auxiliary light sensor 218 and the second auxiliary light sensor 220 in the same processing component are connected in series. The serial connections in each of the first balanced detectors is in communication with a first data line 228 that carries the output from the first balanced detector as a first data signal. The serial connections in each of the second balanced detector is in communication with a second data line 232 that carries the output from the second balanced detector as a second data signal. The first data signals are each an electrical representation of a first composite signal and the second data signals are each an electrical representation of one of the second composite signals. Accordingly, the first data signals each includes a contribution from a first waveform and a second waveform and the second data signal is a composite of the first waveform and the second waveform. The portion of the first waveform in a first data signal is phase-shifted relative to the portion of the first waveform in the second data signal but the portion of the second waveform in the first data signal is in-phase relative to the portion of the second waveform in the first data signal. For instance, the second data signal includes a portion of the reference signal that is phase shifted relative to a different portion of the reference signal that is included the first data signal. Additionally, the second data signal includes a portion of the comparative signal that is in-phase with a different portion of the comparative signal that is included in the first data signal. Each of the first data signals and the second data signals are beating as a result of the beating between one of the comparative signal and the associated reference signal, i.e. the beating in the first composite signal and in the second composite signal.

The electronics 62 include a transform mechanism 238 configured to perform a mathematical transform on each of the associated pairs of first data signals and second data signals. An associated pair is the first data signals and the second data signal from the same processing component. The mathematical transform can be a complex Fourier transform with a first data signal and the associated second data signal as inputs. Since a first data signal is an in-phase component and the associated second data signal its quadrature component, the first data signal and the associated second data signal together act as a complex data signal where the first data signal is the real component and the associated second data signal is the imaginary component of the input.

The transform mechanism 238 includes a switch that receives data signals from the processing unit. The switch receives more input signals than are output by the switch. For instance, the transform mechanism 238 includes a switch 260 that receives the first data signal and the second data signal from the second processing unit 34 on the first data line 228 and the second data line 232. The electronics can operate the switch 260 such that during a first mode, the switch outputs the first data signal from the processing unit 34 but does not output the second data signal and during a second mode, the switch 260 outputs the second data signal and does not output the first data signal. Suitable switches include, but are not limited to, analog switches such as GaAs MMICs (Monolithic Microwave Integrated Circuits), for example HMC545A from Analog Devices, and combined transimpedance amplifier (TIA) and multiplexer integrated circuits such as the 4-channel LTC6561 from Analog Devices.

The output from the switch 260 is received at an Analog-to-Digital Converter (ADC) 261. Accordingly, the Analog-to-Digital Converter (ADC) 261 receives the first data signal or the second data signal depending on the mode of operation of the switch 260. When the Analog-to-Digital Converter (ADC) 261 receives the first data signal, the Analog-to-Digital Converter (ADC) 261 converts the first data signal from an analog form to a digital form that serves as a first digital data signal that is output by the Analog-to-Digital Converter (ADC) 261. When the Analog-to-Digital Converter (ADC) 261 receives the second data signal, the Analog-to-Digital Converter (ADC) 261 converts the second data signal from an analog form to a digital form that serves as a second digital data signal that is output by the Analog-to-Digital Converter (ADC) 261.

The output of the Analog-to-Digital Converter (ADC) 261 is received by a delay 262. Accordingly, the delay 262 receives the first digital data signal or the second digital data signal depending on the mode of operation of the switch 260. The delay 262 is configured to output the first digital data signal on a first line 264 and the second digital data signal on a second line 266. The delay 262 can delay the first digital data signal before outputting the first digital signal on the first line 264 or can pass the first digital signal to the first line 264 without a time delay or without a substantial delay. The delay 262 can delay the second digital data signal before outputting the second digital signal on the second line 266 or can pass the second digital signal to the second line 266 without a time delay or without a substantial time delay.

The delay 262 can temporarily store the first digital data signal and/or in the output of the second digital data signal in order to create the desired time delay in the output of the first digital data signal and/or the second digital data signal. The storage of digital data signals can be achieved by storage mechanisms including, but not limited to, memory buffering.

The delay 262 can concurrently and/or independently output the first digital data signal and the second digital data signal. Since the first data signal and the second data signal together act as a complex data signal where the first data signal is the real component and the associated second data signal is the imaginary component, the first digital data signal and the second digital data signal can also act as a secondary complex signal.

The first digital data signal and the second digital data signal output from the delay 262 are received at a mathematical operation component 268 on multiple different input lines. Accordingly, the mathematical operation component 268 receives multiple different digital signals as inputs. As a result, the mathematical operation component 268 can receive the secondary complex data signal from the delay 262. The mathematical operation component 268 can be configured to perform a mathematical operation on the received signals. For instance, the mathematical operation component 268 can perform one or, two, or three functions selected from the group consisting of: combining data carried in the different input signals to produce the output of the mathematical operation, combining the different input signals to produce the output of the mathematical operation, concurrently operating on the different input signals to produce the output of the mathematical operation, and applying a mathematical function to the different input signals so as to produce the output of the mathematical operation. Accordingly, the output of the mathematical operation is a function of the input signals. When applying the mathematical function to the different input signals so as to produce the output of the mathematical operation, the different input signals can serve as arguments and/or independent variables for the mathematical function. Examples of suitable mathematical operations include, but are not limited to, mathematical transforms such as Fourier transforms. In one example, the mathematical operation performs a Fourier transform on the secondary complex signal so as to convert from the time domain to the frequency domain. The mathematical transform can be a complex transform such as a complex Fast Fourier Transform (FFT). A complex transform such as a complex Fast Fourier Transform (FFT) provides an output that indicates an unambiguous solution for the shift in frequency of the comparative signal relative to the system output signal (the beat frequency) that is caused by the radial velocity between the reflecting object and the LIDAR chip. For instance, a complex Fast Fourier Transform (FFT) can provide an output that indicates magnitude as a function of frequency. As a result, a peak in the output of the complex transform can occur at and/or indicate the correct solution for the beat frequency. The mathematical operation component 268 can execute the attributed functions using firmware, hardware or software or a combination thereof.

Figure 7C:
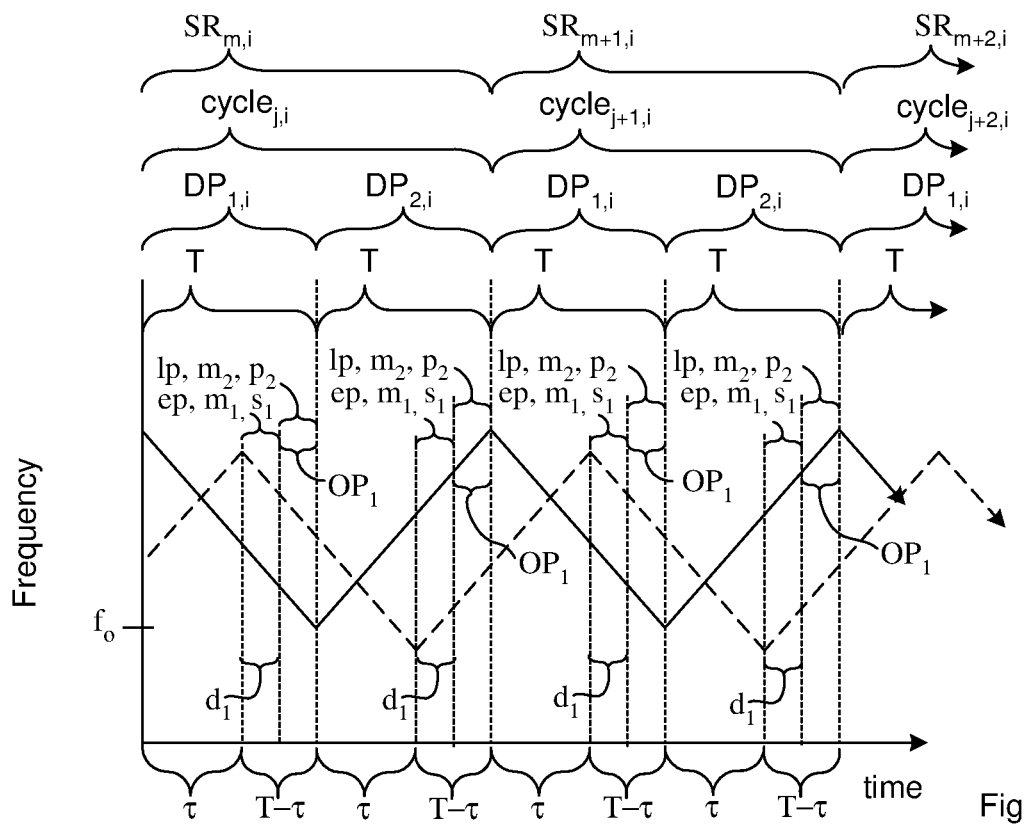
FIG. 7C is a graph of an example of a frequency versus time pattern for a LIDAR output signal output from a LIDAR chip constructed according to FIG. 1A.

The electronics include a LIDAR data generator 270 that receives the output from the mathematical operation component 268. The LIDAR data generator 270 can perform a peak find on the output of the transform component 268 to identify the peak in the frequency of the output of the transform component 268. The LIDAR data generator 270 treats the frequency at the identified peak as the beat frequency of the beating signals. The LIDAR data generator 270 can use the identified beat frequencies in combination with the frequency pattern of the system output signal and the operational pattern of the switch 260 and the delay 262 to generate the LIDAR data. FIG. 7C has a solid line that shows an example of a suitable frequency pattern for the system output signal and accordingly for the reference signal. FIG. 7C also has a dashed line that shows the frequency pattern for the system return signal that results from reflection of the system output signal by an object.

FIG. 7C shows the frequency versus time pattern over a sequence of two cycles labeled $cycle_j$ and $cycle_{j+1}$. In some instances, the frequency versus time pattern is repeated in each cycle as shown in FIG. 7C. The illustrated cycles do not include re-location periods and/or re-location periods are not located between cycles. As a result, FIG. 7C illustrates the results for a continuous scan.

Each cycle includes K data periods that are each associated with a period index k and are labeled $DP_{k,i}$ where i represents a channel index. In the example of FIG. 7C, each cycle includes two data periods (with k=1 and 2). In some instances, the frequency versus time pattern is the same for the data periods that correspond to each other in different cycles as is shown in FIG. 7C. Corresponding data periods are data periods with the same period index. As a result, each data period $DP_{1,i}$ can be considered corresponding data periods for that same channel index (i) and the associated frequency versus time patterns are the same in FIG. 7C. At the end of a cycle, the electronics return the frequency to the same frequency level at which it started the previous cycle.

During each data period, the frequency of the system output signal is varied at a constant rate. The rate can be zero but at least a portion of the data periods in each cycle have the system output signal varied at a non-zero rate. The direction and/or rate of the frequency change changes at the change of data periods from the same cycle. For instance, during the data period $DP_{1,i}$ and the data period $DP_{2,i}$, the electronics operate the light source such that the frequency of the system output signal changes at a linear rate α. The direction of the frequency change during the data period $DP_{1,i}$ is the opposite of the direction of the frequency change during the data period $DP_{2,i}$.

The solid line in FIG. 7C can represent the frequency pattern of the system output signal at the time that the system output signal exits from the LIDAR system and the dashed line can represent the frequency pattern of the system return signal at the time that the system return signal enters the LIDAR system. Since the light from the system output signal has taken a round trip from the LIDAR system, to an object, and back to the LIDAR system, there is a delay between the system output signal exiting from the LIDAR system and the reflected light returning to the LIDAR system in the system return signal. The duration of the data periods is labeled T.

LIDAR systems are generally associated with a maximum operational distance that represents the largest distance between the LIDAR system and an object for which the LIDAR system can reliably generate LIDAR results and/or for which the LIDAR system is configured to generate LIDAR results. The time in which a system output signal can travel from the LIDAR system to an object positioned at the maximum operational distance and then back to the LIDAR system (round trip time) is labeled τ FIG. 7C.

Because the round trip time (τ) at the maximum operational distance expires before the data period ends, a system return signal reflected by an object within the maximum operational distance will have returned to the LIDAR system during a data collection window that occurs between expiration of τ and the expiration of the data period labeled T. The location of the data collection windows are each labeled T–τ on the time axis of FIG. 7C. Each data collection window includes a prior window portion (labeled ep) and a latter window portion (labeled lp). Since the system return signal will return to the LIDAR within the data collection window for an object that is within the maximum operational distance, the LIDAR system can use the portion of the system return signal within the prior window portion (labeled ep) and the latter window portion (labeled lp) to generate the LIDAR data for objects within the maximum operational distance. However, for objects beyond the maximum operational distance, it is possible that a system return signal will not have returned to the LIDAR system within the data collection window. Accordingly, in some instances, it may not be possible to accurately generate LIDAR data for objects beyond or substantially the maximum operational distance.

In the example of FIG. 7C, the switch 260 is operated in the first mode (labeled $m_1$) during the prior window portion and the switch 260 is operated in the second mode (labeled $m_2$) during the latter window portion. As a result, during each data period in the configuration of FIG. 7C, the switch 260 outputs the first data signal before outputting the second data signal.

In some instances, the duration of the prior window portion is equal to the duration of the latter window portion. As an example, the duration of the prior window portion and the duration of the latter window portion can each be equal to one half the duration of the data collection window. In FIG. 7C, the duration of the first window portion and the duration of the second window portion can each be (T–τ)/2. The duration of the prior window portion can be different from the duration of the latter window portion. For instance, the duration of the prior window portion can exceed the duration of the latter window portion.

The delay 262 is operated such that at least a portion of the first digital data signal is output on the first line 264 concurrently with output of at least a portion of the second digital signal on the second line 266 during the latter window portion (lp). In some instances, the delay 262 concurrently outputs the first digital data signal and the second digital signal for the duration of the latter window portion (lp). The portion of the first digital data signal and the portion of the second digital signal concurrently output from the delay 262 during the latter window portion (Ip) are from the same data period.

FIG. 7C also illustrates the operation of the delay 262 such that the delay 262 concurrently outputs the portion of the first digital data signal and the second digital signal during the latter window portion (lp). To create this result, the delay 262 can operates on the first digital data signal in two different modes. In a first storage mode, the delay 262 can store the first digital data signal. In a first output mode, the delay 262 can output the previously stored first digital data signal on the first line. In FIG. 7C, times where the delay 262 operates in the first storage mode are labeled $S_1$ and times where the delay 262 operates in the first output mode are labeled $OP_1$. The delay 262 can operates on the second digital data signal in a second pass mode where the delay 262 can pass the second digital data signal to the second line 266 without substantial time delay. In FIG. 7C, times where the delay 262 operates in the second pass mode are labeled $P_2$.

In each of the prior window portions (ep) shown in FIG. 7C, the switch 260 is operated in the first mode and the delay 262 is operated in the first storage mode are labeled $S_1$. As a result, when an object within the maximum operational distance reflects the system output signal that is returned to the LIDAR system, the delay 262 receives and stores the first digital data signal during the prior window portion (ep). In each of the latter window portions (p) shown in FIG. 7C, the switch 260 is operated in the second mode and the delay 262 is operated in the second pass mode ($P_2$) and in the first output mode ($OP_1$). As a result, when an object within the maximum operational distance reflects the system output signal that is returned to the LIDAR system, the delay 262 receives and passes the second digital data signal during the latter window portion (lp) and the delay 262 also outputs the stored portion of the first digital data signal during the latter window portion (lp). Accordingly, during the latter window portion (lp), the delay 262 concurrently outputs a portion of the first digital data and a portion of the second digital data signal from the same data period.

In FIG. 7C, the delay 262 receives and stores the first digital data signal before outputting the first digital data signal. As a result, the delay 262 creates a time delay ($d_1$) between the receipt of the first digital data signal by the delay 262 and the subsequent output of the first digital data signal from the delay. The duration of the delay can be equal to or greater than the duration of the latter window portion (lp). Additionally, the first digital data signal can be stored for the duration of the delay. In these instances, the stored first digital data signal can be output for the duration of the latter window portion (lp).

Although FIG. 7C illustrates the switch operated in the first mode ($m_1$) during the prior window portion and operated in the second mode ($m_2$) during the latter window portion, different data periods can include a variety of different arrangements of the first window portion and the second window portion. Although FIG. 7C illustrates the duration of the first mode operation ($m_1$) being equal to the duration of the prior window portion and the duration of the second mode operation ($m_2$) being equal to the duration of the latter window portion, the duration of the first mode operation ($m_1$) and/or the duration of the second mode operation ($m_2$) can be different from the duration of the prior window portion and/or the duration of the latter window portion.

Figure 7D:
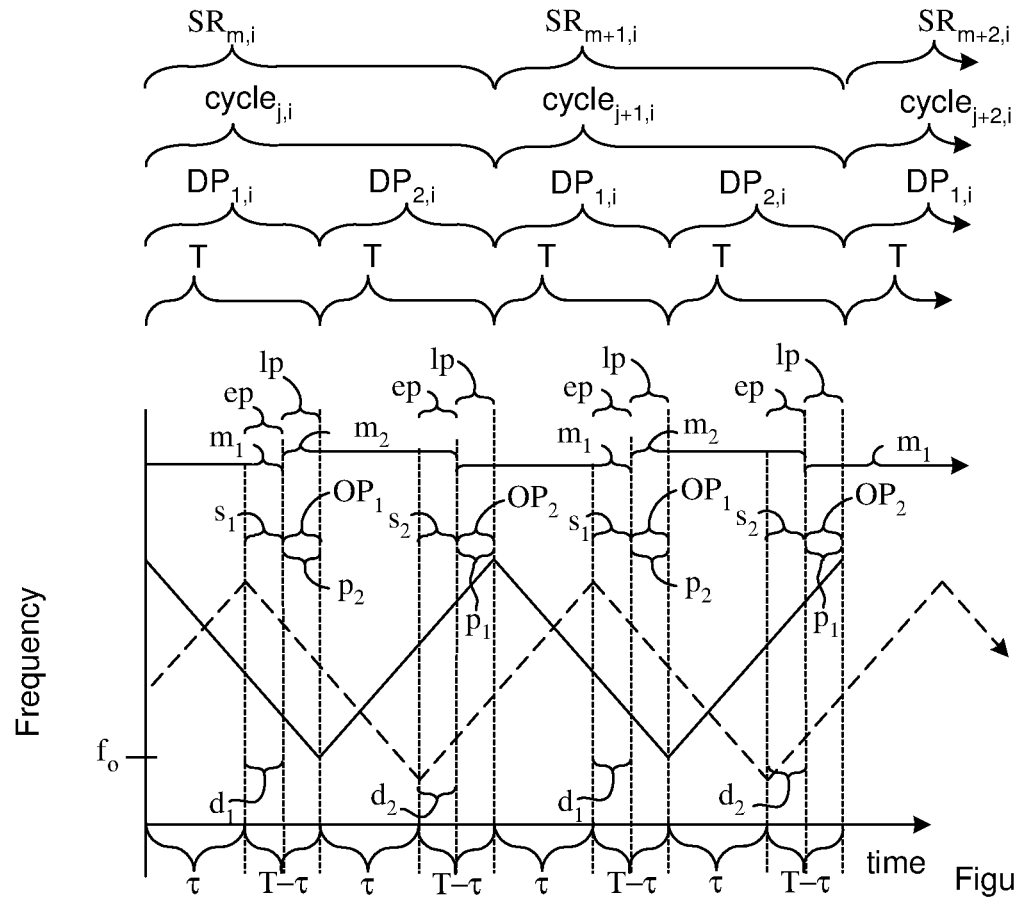
FIG. 7D is a graph of another example of a frequency versus time pattern for a LIDAR output signal output from a LIDAR chip constructed according to FIG. 1A.

FIG. 7D illustrates another example of the output pattern of the delay 262 and switch 260 for use with the frequency pattern of FIG. 7C. FIG. 7D illustrates duration of the first mode operation ($m_1$) equal to the duration of the data period and the duration of the second mode operation ($m_2$) equal to the duration of the data period (T). Additionally, a portion of the data periods have the switch operated in the first mode ($m_1$) during the prior window portion and the switch operated in the second mode ($m_2$) during the latter window portion while another portion of the data periods have the switch operated in the second mode ($m_1$) during the prior window portion and the switch operated in the first mode ($m_2$) during the latter window portion.

The delay 262 is operated such that the delay 262 concurrently outputs the first digital data signal on the first line 264 and the second digital signal on the second line 266 during the latter window portion (lp). In some instances, the delay 262 concurrently outputs the first digital data signal and the second digital signal for the duration of the latter window portion (lp). To create this effect, the delay 262 can operates on the first digital data signal in at least three different modes. In a first storage mode, the delay 262 can store the first digital data signal. In a first output mode, the delay 262 can output a stored first digital data signal on the first line. For instance, during a first output mode, the delay 262 can output on the first line all or a portion of the first digital data signal that was stored during a first storage mode that started before the current first output mode. In a first pass mode, the delay 262 can pass the first digital data signal to the first line 264 without substantial time delay. In FIG. 7D, times where the delay 262 operates in the first storage mode are labeled $S_1$, times where the delay 262 operates in the first output mode are labeled $OP_1$, and times where the delay 262 operates in the first pass mode are labeled $P_1$.

The first storage modes and the first output modes can be selected such that the portion of the first digital data signal that is output on the first line was stored during the last one of the first storage modes that started concurrently with or before the start of the current first output mode. For instance, in FIG. 7D, the first output modes each follows a first storage mode in time. During each of the first output modes, the delay can output a portion of the first digital data signal that was stored during the last first storage mode that started prior to or concurrently with the start of the first output mode. Although FIG. 7D shows the first output modes in sequence with the first storage modes, a portion of the first output mode can overlap a portion of the first storage mode where the first digital data signal is stored. As a result, the delay 262 can be storing a first digital data signal while outputting an earlier portion of the same first digital data signal that was previously stored.

The delay 262 can operate on the second digital data signal in at least three different modes. In a second storage mode, the delay 262 can store the second digital data signal. In a second output mode, the delay 262 can output a stored second digital data signal on the second line. For instance, during the second output mode, the delay 262 can output on the second line all or a portion of the second digital data signal that was stored during last the second storage mode that started before the current second output mode. In a second pass mode, the delay 262 can pass the second digital data signal to the second line 266 without substantial time delay. In FIG. 7D, times where the delay 262 operates in the second storage mode are labeled $S_2$, times where the delay 262 operates in the second output mode are labeled $OP_2$, and times where the delay 262 operates in the second pass mode are labeled $P_2$.

The second storage modes and the second output modes can be selected such that the portion of the second digital data signal that is output on the second line was stored during the last one of the second storage modes that started concurrently with or before the start of the current second output mode. For instance, in FIG. 7D, the second output modes each follows a second storage mode in time. During each of the second output modes, the delay can output a portion of the second digital data signal that was stored during the last second storage mode that started prior to or concurrently with the start of the second output mode. Although FIG. 7D shows the second output modes in sequence with the second storage modes, a portion of the second output mode can overlap a portion of the second storage mode where the second digital data signal is stored. As a result, the delay 262 can be storing a second digital data signal while outputting an earlier portion of the same second digital data signal that was previously stored.

In a first portion of the prior window portions (ep) where the switch 260 is operated in the first mode, the delay 262 is operated in the first storage mode ($S_1$). As a result, when an object within the maximum operational distance reflects a system output signal that is returned to the LIDAR system, the delay receives and stores the resulting first digital data signal during the first portion of the prior window portions (ep). In a first portion of the latter window portions (lp) where the switch 260 is operated in the second mode, the delay 262 is operated in the second pass mode ($P_2$) and in the first output mode ($OP_1$). As a result, when an object within the maximum operational distance reflects a system output signal that is returned to the LIDAR system, the delay 262 receives and passes the second digital data signal during the first portion of the latter window portions (lp) and the delay 262 also outputs a portion of the first digital data signal during the first portion of the latter window portions (lp). The portion of the first digital data signal output during the first portion of the latter window portions (lp) can be the stored during the latest first storage mode ($S_1$) that started before the start of the latter window portion (lp). Accordingly, during the first portion of the latter window portions (lp), the delay 262 concurrently outputs a portion of the first digital data and a portion of the second digital data signal from the same data period. As a result, the delay 262 outputs the secondary complex signal during the first portion of the latter window portions.

In a second portion of the prior window portions (ep) where the switch 260 is operated in the second mode, the delay 262 is operated in the second storage mode ($S_2$). As a result, when an object within the maximum operational distance reflects a system output signal that is returned to the LIDAR system, the delay receives and stores the resulting second digital data signal during the second portion of the prior window portions (ep). In a second portion of the latter window portions (lp) where the switch 260 is operated in the first mode, the delay 262 is operated in the first pass mode ($P_1$) and in the second output mode ($OP_2$). As a result, when an object within the maximum operational distance reflects a system output signal that is returned to the LIDAR system, the delay 262 receives and passes the first digital data signal during the second portion of the latter window portions (lp) and the delay 262 also outputs a portion of the second digital data signal during the second portion of the latter window portions (lp). The portion of the second digital data signal output during the second portion of the latter window portions (lp) can be the stored during the latest second storage mode ($S_2$) that started before the start of the latter window portion (lp). Accordingly, during the second portion of the latter window portions (lp), the delay 262 concurrently outputs a portion of the first digital data signal and a portion of the second digital data signal from the same data period. As a result, the delay 262 outputs the secondary complex signal during the second portion of the latter window portions and also during the first portion of the latter window portions.

In the first portions of the prior window portions (ep) shown in FIG. 7D, the delay 262 receives and stores the first digital data signal before outputting the previously stored first digital data signal during the following latter window portions (lp). As a result, the delay 262 creates a time delay ($d_1$) between receiving the first digital data signal at the start of the prior window portion (ep) and the subsequent output of the stored first digital data signal from the delay 262 at the start of the latter window portion (lp). The duration of the delay ($d_1$) can be equal to or greater than the duration of the latter window portion (lp) and the first digital data signal can be stored for the duration of the delay. In these instances, the stored first digital data signal can be output for the duration of the latter window portion (lp).

In the second portions of the prior window portions (ep) shown in FIG. 7D, the delay 262 receives and stores the second digital data signal before outputting the previously stored second digital data signal during the following latter window portions (lp). As a result, the delay 262 creates a time delay ($d_2$) between receiving the second digital data signal at the start of the prior window portion (ep) and the subsequent output of the stored second digital data signal from the delay 262 at the start of the latter window portion (lp). The duration of the delay ($d_2$) can be equal to or greater than the duration of the latter window portion (lp) and the second digital data signal can be stored for the duration of the delay. In these instances, the stored second digital data signal can be output for the duration of the latter window portion (lp).

The LIDAR data generator can combine beat frequencies ($f_{LDP}$) from different data periods in the same cycle with the same channel index to generate the LIDAR data. For instance, the LIDAR data for sample region $SR_{M,i}$ can be generated from the data periods $DP_{1,i}$ and $DP_{2,i}$ in cycle$_{j,i}$. The following equation applies during a data period where electronics increase the frequency of the system output signal during the data period such as occurs in data period $DP_{1,i}$ of FIG. 7C and FIG. 7D: $f_{ub} = -f_d - \alpha\tau$ at where $f_{ub}$ is the beat frequency provided by the mathematical operation component, $f_d$ represents the Doppler shift ($f_d = 2vf_c/c$) where $f_c$ represents the optical frequency ($f_o$), c represents the speed of light, v is the radial velocity between a reflecting object and the LIDAR system where the direction from the reflecting object toward the chip is assumed to be the positive direction, and c is the speed of light. The following equation applies during a data period where electronics decrease the frequency of the outgoing LIDAR signal such as occurs in data period $DP_{2,i}$ of FIG. 7C and FIG. 7D: $f_{db} = -f_d - \alpha\tau$ where $f_{db}$ is a beat frequency provided by the mathematical operation component. In these two equations, $f_d$ and $\tau$ are unknowns. When these equations are solved for the two unknowns, the radial velocity for the sample region can be determined from the Doppler shift ($v = c^*f_d/(2f_c)$) and/or the separation distance for that sample region can be determined from $c^*f_d/2$. Suitable LIDAR data generators include, but are not limited to, Digital Signal Processors (DSPs).

The operational pattern of the switch 260 and the delay 262 illustrated in FIG. 7C and FIG. 7D are examples and other operational patterns can be employed to cause the delay 262 to concurrently output the second digital data signal (sdds) and the first digital data signal (fdds). For instance, operation of the delay 262 in the first storage mode ($S_1$) and/or in the second storage mode ($S_2$) can begin earlier than illustrated. For instance, operation of the delay 262 in the first storage mode ($S_1$) and/or in the second storage mode ($S_2$) can begin before the expiration of the largest round trip time periods labeled t. As another example, operation of the delay 262 in the first pass mode ($p_1$) and/or in the second pass mode ($p_2$) can extend later than illustrated. For instance, operation of the delay 262 in the first pass mode ($p_1$) and/or in the second storage mode ($p_2$) can extend beyond the beginning of the largest round trip time periods labeled t.

Figure 8A:
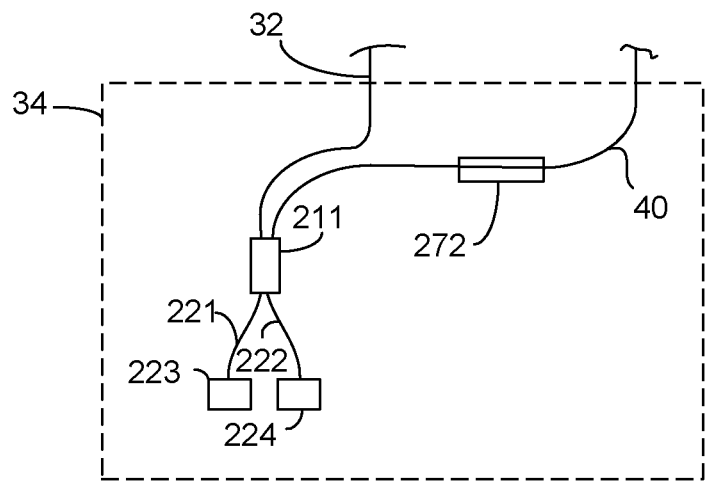
FIG. 8A illustrates another example of a processing unit suitable for use with the LIDAR system of FIG. 1A.

In the processing unit of FIG. 7A and the electronics of FIG. 7B, the first data signal and the second data signal are generated concurrently and/or in parallel, however, the first data signal and the second data signal can be generated in series. FIG. 8A illustrates an example of a processing unit 34 suitable for use with the LIDAR system of FIG. 1A and for generating the first data signal and the second data signal in series. As described in the context of FIG. 1A, the processing component 34 receives a comparative signal from a comparative waveguide 32 and a reference signal from a reference waveguide 40. The comparative waveguide 32 carries the comparative signal to a first light-combining component 211. The reference waveguide 40 carries the reference signal to the first light-combining component 211.

The first light-combining component 211 combines the comparative signal and the reference signal into a first composite signal. Due to the difference in frequencies between the first portion of the comparative signal and the first portion of the reference signal, the first composite signal is beating between the comparative signal and the reference signal.

The light-combining component 211 also splits the first composite signal onto a first detector waveguide 221 and a second detector waveguide 222. The first detector waveguide 221 carries a first portion of the first composite signal to a first light sensor 223 that converts the first portion of the second composite signal to a first electrical signal. The second detector waveguide 222 carries a second portion of the second composite signal to a second auxiliary light sensor 224 that converts the second portion of the second composite signal to a second electrical signal. Examples of suitable light sensors include germanium photodiodes (PDs), and avalanche photodiodes (APDs).

In some instances, the light-combining component 211 splits the first composite signal such that the portion of the comparative signal (i.e. the portion of the first portion of the comparative signal) included in the first portion of the composite signal is phase shifted by 180° relative to the portion of the comparative signal (i.e. the portion of the first portion of the comparative signal) in the second portion of the composite signal but the portion of the reference signal (i.e. the portion of the first portion of the reference signal) in the first portion of the composite signal is not phase shifted relative to the portion of the reference signal (i.e. the portion of the first portion of the reference signal) in the second portion of the composite signal. Alternately, the light-combining component 211 splits the composite signal such that the portion of the reference signal (i.e. the portion of the first portion of the reference signal) in the first portion of the composite signal is phase shifted by 180° relative to the portion of the reference signal (i.e. the portion of the first portion of the reference signal) in the second portion of the composite signal but the portion of the comparative signal (i.e. the portion of the first portion of the comparative signal) in the first portion of the composite signal is not phase shifted relative to the portion of the comparative signal (i.e. the portion of the first portion of the comparative signal) in the second portion of the composite signal.

A tunable phase shifter 272 is positioned along the reference waveguide 40 and is configured to tune the phase of the reference signal. The electronics can operate the phase shifter 272 so as to tune the phase of the reference signal. The phase shifter 272 can be operated in at least a first phase mode and a second phase mode. During operation of the phase shifter in the first phase mode, the reference signal output from the phase shifter serves as a first mode reference signal. During operation of the phase shifter in the second phase mode, the reference signal output from the phase shifter serves as a second mode reference signal. Suitable phase shifters 272 include, but are not limited to, PIN diodes, PN junctions, and thermal heaters. Suitable phase shifters 272 for use with ridge waveguides include, but are not limited to, PIN diodes, PN junctions, and thermal heaters.

The second phase mode and the second phase mode can be selected such that the first mode reference signal and the second mode reference signal have a phase difference of 90°. As a result, the first mode reference signal can serve as an in-phase component and the second mode reference signal can serve as a quadrature component or the second mode reference signal can serve as an in-phase component and the first mode reference signal can serve as a quadrature component. Accordingly, the first mode reference signal can be a sinusoidal function and the second mode reference signal can be a cosine function or the second mode reference signal can be a sinusoidal function and the first mode reference signal can be a cosine function. In one example, the phase shifter 272 is operated such that the first mode reference signal is a cosine function and the second mode reference signal is a sine function.

Figure 8B:
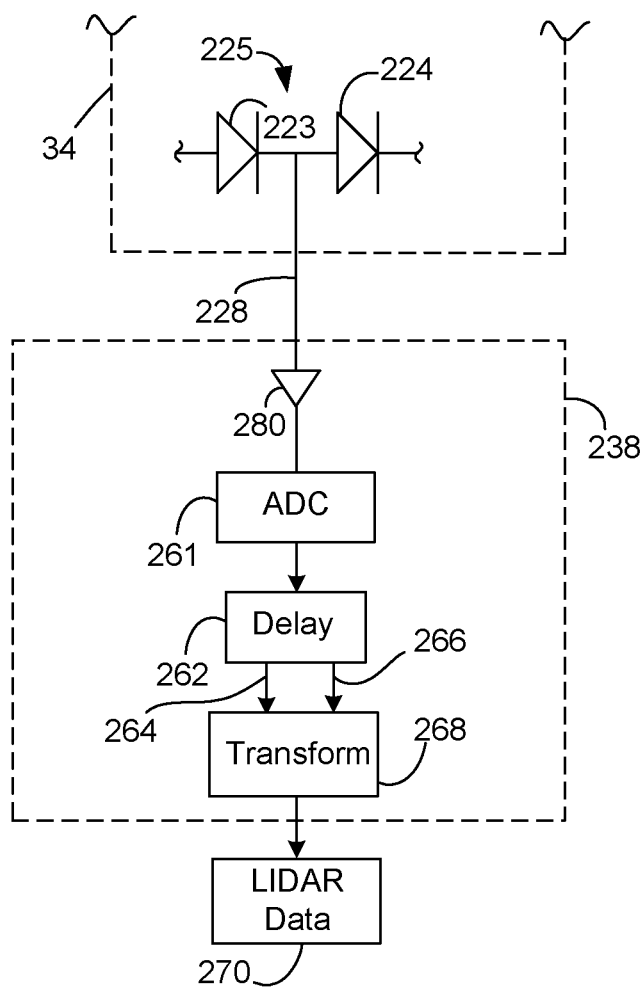
FIG. 8B provides a schematic of electronics that are suitable for use with a processing unit constructed according to FIG. 8A.

FIG. 8B provides a schematic of the relationship between the electronics and the light sensors in the processing component of FIG. 8A. The symbol for a photodiode is used to represent the first light sensor 223 and the second light sensor 224 but one or more of these sensors can have other constructions. In some instances, all of the components illustrated in the schematic of FIG. 8B are included on the LIDAR chip. In some instances, the components illustrated in the schematic of FIG. 8B are distributed between the LIDAR chip and electronics located off of the LIDAR chip.

The electronics connect the first light sensor 223 and the second light sensor 224 as a first balanced detector 225. In particular, the first light sensor 223 and the second light sensor 224 are connected in series. The serial connections in the first balanced detector 225 is in communication with a first data line 228 that carries the output from the first balanced detector as a data signal. The data signal can serve as an electrical representation of the first composite signal. When the phase shifter 272 is operated in the first phase mode and outputs the first mode reference signal, the resulting data signal serves as the first data signal. When the phase shifter 272 is operated in the second phase mode and outputs the second mode reference signal, the resulting data signal serves as the second data signal.

The first data signals each includes a contribution from a first waveform and a second waveform and the second data signal is a composite of the first waveform and the second waveform. The portion of the first waveform in a first data signal is phase-shifted relative to the portion of the first waveform in the second data signal but the portion of the second waveform in the first data signal is in-phase relative to the portion of the second waveform in the first data signal. For instance, the second data signal includes a portion of the reference signal that is phase shifted relative to a different portion of the reference signal that is included the first data signal. Additionally, the second data signal includes a portion of the comparative signal that is in-phase with a different portion of the comparative signal that is included in the first data signal. As noted above, the amount of the phase shift can be selected such that the first data signal is an in-phase component and the associated second data signal is the quadrature component. As a result, the first data signal and the associated second data signal together act as a complex data signal. The first data signals and the second data signals are beating as a result of the beating between at least a portion of the comparative signal and at least a portion of the reference signal.

The electronics 62 include a transform mechanism 238 configured to identify a beat frequency for the composite signal. The transform mechanism 238 includes an Analog-to-Digital Converter (ADC) 261 that receives the data signal. When the Analog-to-Digital Converter (ADC) 261 receives the data signal, the Analog-to-Digital Converter (ADC) 261 converts the data signal from an analog form to a digital form that serves as a digital data signal that is output by the Analog-to-Digital Converter (ADC) 261. When the phase shifter 272 is operated in the first phase mode and outputs the first mode reference signal, the resulting digital data signal serves as the first digital data signal. When the phase shifter 272 is operated in the second phase mode and outputs the second mode reference signal, the resulting digital data signal serves the second digital data signal.

The output of the Analog-to-Digital Converter (ADC) 261 is received by the delay 262. Accordingly, the delay 262 receives the digital data signal. The delay 262 is configured to output the first digital data signal on a first line 264 and the second digital data signal on a second line 266. The delay 262 can delay the first digital data signal before outputting the first digital signal on the first line 264 or can pass the first digital signal to the first line 264 without a time delay or without a substantial delay. The delay 262 can delay the second digital data signal before outputting the second digital signal on the second line 266 or can pass the second digital signal to the second line 266 without a time delay or without a substantial time delay.

The delay 262 can temporarily store the first digital data signal and/or in the output of the second digital data signal in order to create a time delay in the output of the first digital data signal and/or the second digital data signal. The storage of digital data signals can be achieved by storage mechanisms including, but not limited to, buffering. Suitable delays 262 include, but are not limited to, software, hardware, ASICs, digital memory buffers, and combinations thereof.

The delay 262 can concurrently and/or independently output the first digital data signal and the second digital data signal. Since the first data signal and the second data signal together act as a complex data signal where the first data signal is the real component and the associated second data signal is the quadrature component, the first digital data signal and the second digital data signal can also act as a secondary complex signal.

The first digital data signal and the second digital data signal output from the delay 262 are received at a mathematical operation component 268. Accordingly, the mathematical operation component 268 can receives the secondary complex data signal from the delay 262. The mathematical operation component 268 can be configured to perform a mathematical transform on the secondary complex signal so as to convert from the time domain to the frequency domain. The mathematical transform can be a complex transform such as a complex Fast Fourier Transform (FFT). A complex transform such as a complex Fast Fourier Transform (FFT) provides an output that indicates an unambiguous solution for the shift in frequency of the comparative signal relative to the system output signal (the beat frequency) that is caused by the radial velocity between the reflecting object and the LIDAR chip. For instance, a peak in the output of the complex transform can occur at and/or indicate the correct solution for the beat frequency. The mathematical operation component 268 can execute the attributed functions using firmware, hardware or software or a combination thereof.

The electronics include a LIDAR data generator 270 that receives the output from the mathematical operation component 268. As discussed above, the LIDAR data generator 270 can use the output of the mathematical operation component to identify the beat frequency and use the beat frequencies in combination with the frequency pattern of the system output signal and the operational pattern of the switch 260 and the delay 262 to generate the LIDAR data. In order to generate the LIDAR data with a processing unit and electronics constructed according to FIG. 8A and FIG. 8B, the delay 262 can be operated as disclosed in the context of FIG. 7C through FIG. 7D but with the first phase mode of the phase shifter 272 serving as the first mode ($m_1$) for the switch and the second phase mode of the phase shifter 272 serving as the second mode ($m_2$). For instance, the times labeled $m_1$ in FIG. 7C and FIG. 7D can represent times where the phase shifter 272 is operated in the first phase mode and the times labeled $m_2$ in FIG. 7C and FIG. 7D can represent times where the phase shifter 272 is operated in the second phase mode. Operating the switch in the first mode and operating the phase shifter 272 in the first shift mode both cause the first digital data signal to be received at the delay. Additionally, operating the switch in the second mode and operating the phase shifter 272 in the second shift mode both cause the second digital data signal to be received at the delay 262. As a result, the LIDAR data can be generated by operating the LIDAR system as disclosed in the context of FIG. 7C through FIG. 7D.

As shown in FIG. 7B and FIG. 8B, the lines that carry the data signals can optionally include amplifiers 280. Suitable amplifiers 280 include, but are not limited to, transimpedance amplifiers (TIAs).

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A LIDAR system, comprising:
a first light detector configured to output a first electrical signal and a second light detector configured to output a second electrical signal;
an analog-to-digital converter configured to receive the first electrical signal and to convert the first electrical signal to a first digital electrical signal, the analog-to-digital converter also configured to receive the second electrical signal and to convert the second electrical signal to a second digital electrical signal, the first digital electrical signal being a real component of a complex signal and the second digital electrical signal being a quadrature component of the complex signal;

electronics that include a mathematical operation component configured to receive the complex signal from the analog-to-digital converter, the mathematical operation component being configured to perform a mathematical operation on the complex signal; and wherein the analog-to-digital converter outputs the first digital electrical signal and the second digital electrical signal in series.

2. A LIDAR system, comprising:

a first light detector configured to output a first electrical signal and a second light detector configured to output a second electrical signal;

an analog-to-digital converter configured to receive the first electrical signal and to convert the first electrical signal to a first digital electrical signal, the analog-to-digital converter also configured to receive the second electrical signal and to convert the second electrical signal to a second digital electrical signal, first digital electrical signal being a real component of a complex signal and the second digital electrical signal being a quadrature component of the complex signal;

electronics that include a mathematical operation component configured to receive the complex signal from the analog-to-digital converter, the mathematical operation component being configured to perform a mathematical operation on the complex signal; and wherein the analog-to-digital converter receives the first electrical signal and the second electrical signal from an electrical switch configured to be operated in a first mode where the switch outputs the first electrical signal but does not output the second electrical signal and in a second mode where the switch outputs the second electrical signal but does not output the first electrical signal.

3. The system of claim 2, wherein the analog-to-digital converter receives the first electrical signal and the second electrical signal in series.

4. A LIDAR system, comprising:

a first light detector configured to output a first electrical signal and a second light detector configured to output a second electrical signal;

an analog-to-digital converter configured to receive the first electrical signal and to convert the first electrical signal to a first digital electrical signal, the analog-to-digital converter also configured to receive the second electrical signal and to convert the second electrical signal to a second digital electrical signal, the first digital electrical signal being a real component of a complex signal and the second digital electrical signal being a quadrature component of the complex signal; and electronics that include a mathematical operation component configured to receive the complex signal from the analog-to-digital converter, the mathematical operation component being configured to perform a mathematical operation on the complex signal; and wherein the analog-to-digital converter receives the first electrical signal and the second electrical signal in series.

* * * * *